United States Patent
Kim et al.

(10) Patent No.: US 10,989,255 B2
(45) Date of Patent: Apr. 27, 2021

(54) SYNCHRONIZER APPARATUS FOR TRANSMISSION

(71) Applicants: HYUNDAI MOTOR COMPANY, Seoul (KR); KIA MOTORS CORPORATION, Seoul (KR)

(72) Inventors: Chon Ok Kim, Yongin-si (KR); Yong Uk Shin, Suwon-si (KR); Woochurl Son, Seongnam-si (KR); Soonki Eo, Ansan-si (KR); Woo Jin Chang, Suwon-si (KR); Sun Sung Kwon, Anyang-si (KR); Minho Chae, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 54 days.

(21) Appl. No.: 16/427,566

(22) Filed: May 31, 2019

(65) Prior Publication Data
US 2020/0182307 A1 Jun. 11, 2020

(30) Foreign Application Priority Data
Dec. 7, 2018 (KR) .......................... 10-2018-0157490

(51) Int. Cl.
*F16D 23/06* (2006.01)
*F16H 63/30* (2006.01)

(52) U.S. Cl.
CPC ............ *F16D 23/06* (2013.01); *F16H 63/30* (2013.01); *F16D 2023/0618* (2013.01); *F16D 2023/0681* (2013.01); *F16H 2063/3093* (2013.01)

(58) Field of Classification Search
CPC ............ F16D 23/06; F16D 2023/0618; F16D 2023/0681; F16D 2023/0637; F16D 2023/0631; F16H 63/30; F16H 2063/3093; F16H 3/12
See application file for complete search history.

(56) References Cited

U.S. PATENT DOCUMENTS 2,100,312 A * 11/1937 Fawick ..................... F16H 3/04
74/332
6,588,563 B1 * 7/2003 Sarrach ................. F16D 23/025
192/53.34

FOREIGN PATENT DOCUMENTS

EP 0743466 * 11/1996

* cited by examiner

*Primary Examiner* — Mark A Manley
(74) *Attorney, Agent, or Firm* — Brinks Gilson & Lione

(57) ABSTRACT

A synchronizer apparatus for a transmission includes: first and second shifting gears rotatable on an output shaft; a hub spline-coupled with the output shaft and having a slope portion having slanted surfaces; a sleeve spline-coupled with the hub; a key coupled with a recess of a slope portion; first and second clutch gears disposed between the hub and shifting gears; first and second outer rings and first and second inner rings disposed between the hub and clutch gears; first and second synchronizer cones disposed between the first inner and outer rings and the second inner and outer rings; a poppet ball unit disposed at the sleeve and contacting the key through a poppet ball; first and second push blocks disposed at the slanted surfaces; and first and second push springs inserted in spring holes formed at the push blocks to force push blocks to the slanted surfaces.

8 Claims, 14 Drawing Sheets

FIG. 1 "PRIOR ART"

SYNCHRONIZER APPARATUS FOR TRANSMISSION

CROSS-REFERENCE TO RELATED APPLICATION

This application claims priority to and the benefit of Korean Patent Application No. 10-2018-0157490, filed on Dec. 7, 2018, the entire contents of which are incorporated herein by reference.

FIELD

The present disclosure relates to a synchronizer apparatus for a transmission.

BACKGROUND

The statements in this section merely provide background information related to the present disclosure and may not constitute prior art.

A synchronizer apparatus for a transmission of a vehicle is typically a device for synchronously coupling a shifting gear (i.e., a speed gear) to an output shaft by an operation of a shift fork.

FIG. 1 is a cross-sectional view of a typical synchronizer apparatus for a transmission.

Referring to FIG. 1, in a typical synchronizer apparatus for a transmission, a hub 3 is spline coupled with an output shaft 1, and a sleeve 5 is arranged on teeth on an exterior circumference of the hub 3 and movable in an axial direction.

A shifting gear 7 is arranged on the output shaft 1 and a bearing B is interposed between the shifting gear 7 and the output shaft 1 such that the shifting gear 7 may rotate relatively to the output shaft 1. A clutch gear 9 is arranged in an interior side of the shifting gear 7 to integrally rotate with the shifting gear 7.

A synchronizer ring 11 is disposed between the clutch gear 9 and the hub 3, to synchronously couple the clutch gear 9 and the hub 3 by a movement of the sleeve 5.

Key balls 13 are disposed between the hub 3 and the sleeve 5 at three circumferential locations such that the sleeve 5 may have a principal location.

The key balls 13 are elastically abutted by a spring 17 installed in a key ball housing 15 formed at the hub 3, and thereby maintaining contact with a groove G formed on an interior circumference of the sleeve 5.

When the sleeve 5 moves in the axial direction during the shifting operation, the synchronizer ring 11 is coupled with a cone portion 9a of the clutch gear 9 by a conical clutch operation.

During a shifting operation, the shift fork 21 activated by an actuator 20 pushes the sleeve 5 in the axial direction.

Then, the sleeve 5 moves with the key ball 13 in the groove G, thereby also moving the key ball housing 15, and therefore the synchronizer ring 11 is engaged with the cone portion 9a of the clutch gear 9.

When the synchronizer ring 11 and the clutch gear 9 are engaged, the hub 3 and the shifting gear 7 are rotationally synchronized. In this state, the sleeve 5 further moves in the axial direction to be engaged with the clutch gear 9 as well as the synchronizer ring 11.

Since the hub 3 and the shifting gear 7 are mechanically engaged, the shifting gear 7 is synchronously coupled with the output shaft 1 to rotate at a same rotation speed.

According to such a synchronizer apparatus, a neutral period, during which torque transmission is cut off, is involved during the shifting process, thereby deteriorating shift feel and increasing a shifting time.

According to such a conventional synchronizer apparatus, it is notable that only an engaged synchronizer ring 11 is synchronized with a speed gear, and a disengaged synchronizer ring 11 is not synchronized with a speed gear.

We have discovered that when the shift fork moves fast during the shifting operation, the sleeve 5 may collide with a stopper of the clutch gear 9 so that an impact noise is generated, thereby deteriorating shift feel.

The above information disclosed in this Background section is only for enhancement of understanding of the background of the present disclosure and therefore it may contain information that does not form the prior art that is already known to a person of ordinary skill in the art.

SUMMARY

The present disclosure provides a synchronizer apparatus for a transmission having advantages of, by employing push blocks PB1 and PB2 and push springs PS1 and PS2 to both sides of the key 35 and the hub 31, maintaining torque transmission to the to-be-released shifting gear until the to-be-engaged shifting gear is actually initiated to be engaged, thereby reducing or minimizing interruption of torque transmission during the shifting operation. Furthermore, the synchronizer apparatus reduces a shift shock and/or an impact noise that may be created during a shifting operation.

In one form of the present disclosure, a synchronizer apparatus for a transmission may include: first and second shifting gears, a hub, a sleeve, a plurality of keys, first and second clutch gears, first and second outer rings and first and second inner rings, first and second synchronizer cones, a plurality of poppet ball units, a plurality of first and second push blocks, and a plurality of first and second push springs. The first and second shifting gears may be rotatably disposed on an output shaft. The hub spline may be coupled with the output shaft, the hub having a plurality of slope portions having slanted surfaces at both sides of the hub. The plurality of slope portions may be symmetrically disposed along a circumferential direction of the hub. The sleeve spline may be coupled with an external circumference of the hub. The plurality of keys may be installed in key catching recesses that are formed radially outward respectively by the plurality of slope portions. The first and second clutch gears may be disposed between the hub and the first and second shifting gears, respectively. The first and second outer rings and first and second inner rings may be disposed between the hub and the first and second clutch gears, respectively. The first and second synchronizer cones may be disposed between the first inner and outer rings and the second inner and outer rings and engaged with the first and second clutch gears, respectively. The plurality of poppet ball units may be disposed at interior circumference of the sleeve at locations corresponding to the plurality of keys. The poppet ball units may contact an exterior surface of the plurality of keys through a poppet ball. The plurality of first and second push blocks may be disposed at both slanted surfaces of the plurality of slope portions, respectively. The plurality of first and second push springs may be inserted in spring holes formed at outer surfaces of the plurality of first and second push blocks, respectively. The first and second push springs may be abutted by interior surfaces of both bent ends of the plurality of keys such that the cam surfaces of the push blocks may tightly contact the slanted surfaces of the plurality of slope portions of the hub, respectively.

Each of the plurality of keys may include a pressurizing surface formed as a central flat surface on an exterior surface to contact a poppet ball of the poppet ball unit, and a pressure release surface formed as a curved surface extending from both sides of and downward from the pressurizing surface.

Each of the plurality of keys may include an insertion end integrally formed at a bottom center of the key such that the key may be coupled with the hub by the insertion end being inserted in the key catching recess.

Each of the plurality of keys comprises bent ends formed at ends of the pressure release surfaces, thereby forming interior surfaces to abut the first and second push springs.

The poppet ball unit may include a spring housing inserted in an installation hole formed in interior circumference of the sleeve, a ball spring inserted in the spring housing, and a poppet ball inserted in the spring housing and elastically supported by the ball spring to contact and pressurize the exterior surface of the key in a radial direction.

Each of the first and second push blocks may include an outer surface facing an interior surface of a corresponding outer ring, a coupling recess to be coupled with the key, and a cam surface formed as a slant surface to form a surface contact with a slanted surface among the slated surfaces of the slope portions.

Each of the first and second push blocks may further include a protrusion end formed upward from a central upper surface forming the coupling recess, thereby forming a line contact with a bottom surface of the key.

The cross-section of the protrusion end may be a semicircular.

The first and second push springs may be inserted in spring holes formed at outer surfaces of the first and second push blocks, respectively. The first and second push springs may be formed as coil springs abutted by the interior surfaces of the key.

According to a synchronizer apparatus for a transmission according to an exemplary form of the present disclosure, push blocks and push springs are employed to both sides of the key and the hub. During a shifting operation from a to-be-released shifting gear to a to-be-engaged shifting gear, torque transmission to the to-be-released shifting gear is maintained until the to-be-engaged shifting gear is actually initiated to be engaged. Therefore, interruption of torque transmission during the shifting operation is substantially reduced or minimized.

In addition, forces on synchronizer rings at opposite sides of the hub are inversely proportional to each other according to movement of the sleeve, and accordingly, a shift shock and/or an impact noise possibly caused by a stopper and a sleeve may be reduced.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
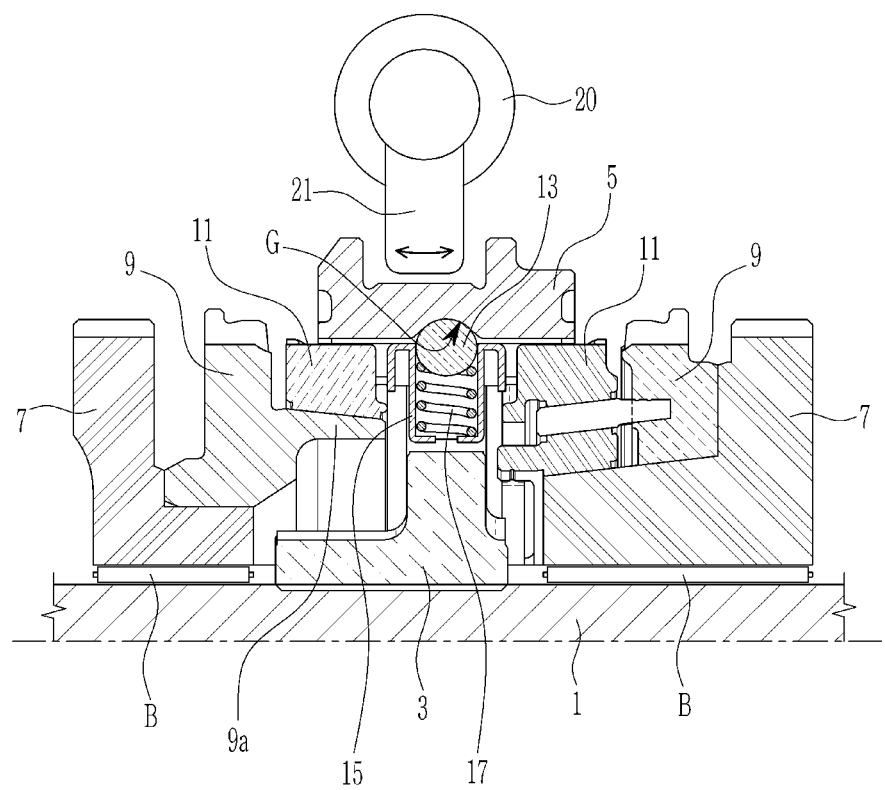
FIG. 1 is a cross-sectional view of a typical synchronizer apparatus for a transmission.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
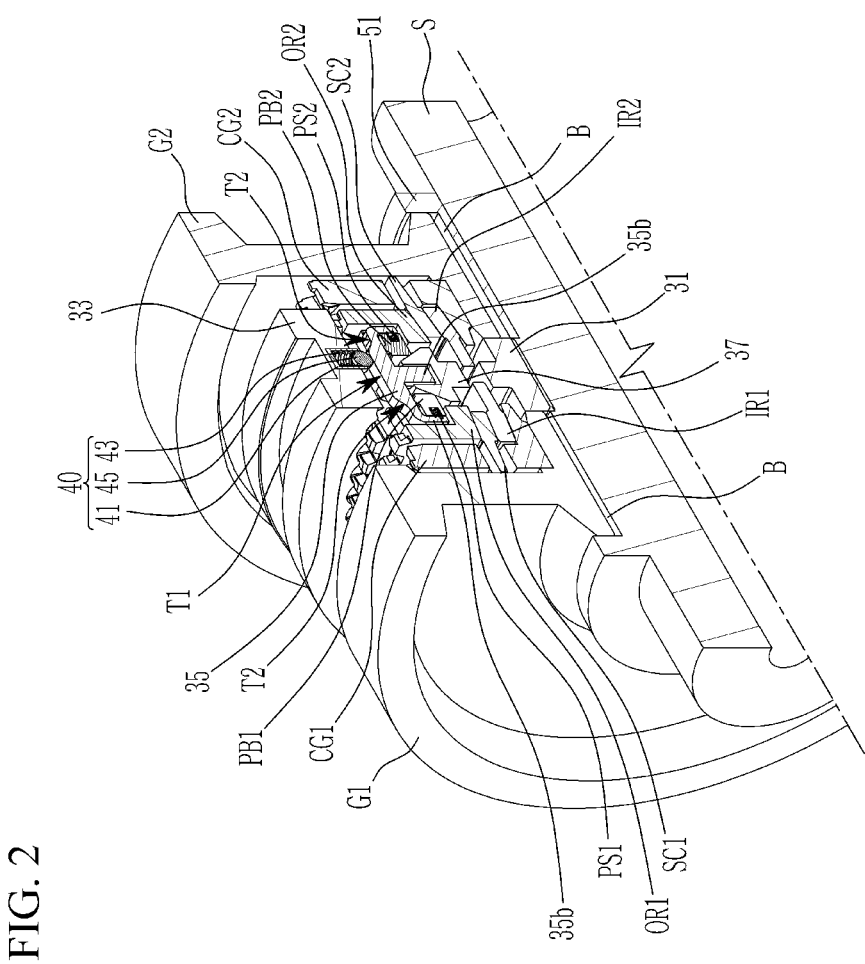
FIG. 2 is a cross-sectional perspective view of a synchronizer apparatus for a transmission according to an exemplary form of the present disclosure.
Figure 3:
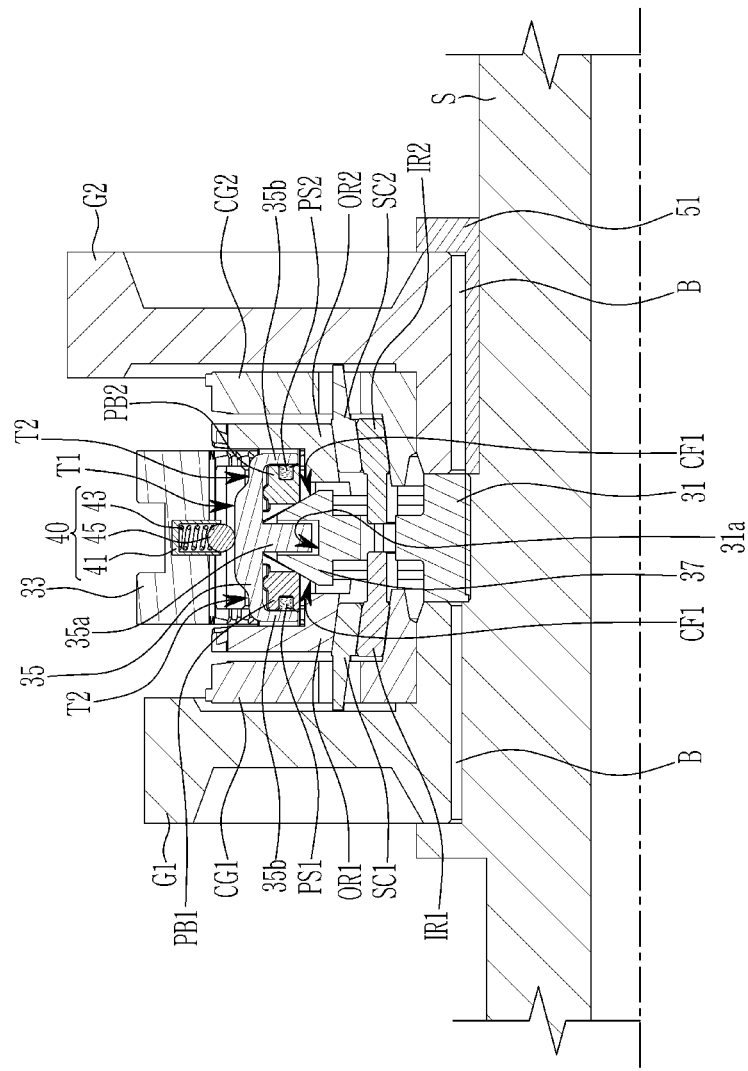
FIG. 3 is a cross-sectional view of a synchronizer apparatus for a transmission according to an exemplary form of the present disclosure.

FIG. 2 is a cross-sectional perspective view of a synchronizer apparatus for a transmission according to an exemplary form of the present disclosure. FIG. 3 is a cross-sectional view of a synchronizer apparatus for a transmission according to an exemplary form of the present disclosure.

Referring to FIG. 2 and FIG. 3, the synchronizer apparatus for a transmission is disposed between first and second shifting gears G1 and G2 mounted on an output shaft S of the transmission, and synchronously connects the first and second shifting gears G1 and G2 with the output shaft S, selectively.

Such a synchronizer apparatus for a transmission includes, on the output shaft S, a hub 31, a sleeve 33, three keys 35, first and second clutch gears CG1 and CG2, first and second outer rings OR1 and OR2, first and second inner rings IR1 and IR2, first and second synchronizer cones SC1 and SC2, a poppet ball unit 40, first and second push blocks PB1 and PB2, and first and second push springs PS1 and PS2.

The first and second shifting gears G1 and G2 are disposed on the output shaft S through a bearing B, to rotate relatively to the output shaft S.

Figure 4:
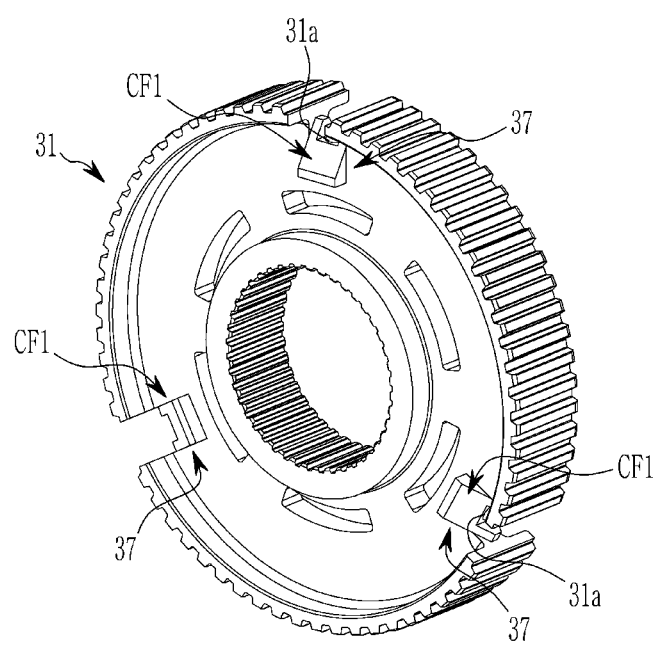
FIG. 4 is a perspective view of a hub applied to a synchronizer apparatus for a transmission according to an exemplary form of the present disclosure.

FIG. 4 is a perspective view of a hub applied to a synchronizer apparatus for a transmission according to an exemplary form of the present disclosure.

Referring to FIG. 4, the hub 31 is disposed between the first and second shifting gears G1 and G2 and spline coupled with the output shaft S. The hub 31 includes three slope portions 37 symmetrically disposed along a circumferential direction. Each of the slope portions 37 has a slanted surface CF1 protruding in an axial direction. Although FIG. 4 illustrates only a single side of the hub 31, it may be understood that an opposite side of the hub 31 may be identically formed.

It may be understood that the number of the slope portions 37 may not be limited to three, and the number of the slope portions 37 may be decided in consideration of design factors.

A gear sleeve 51 is mounted on the output shaft S and fits with the second shifting gear G2. The gear sleeve 51 supports the hub 31 and limits an axial movement of the hub 31.

The sleeve 33 is spline coupled with an external circumference of the hub 31, and is disposed movable in the axial direction.

Figure 5:
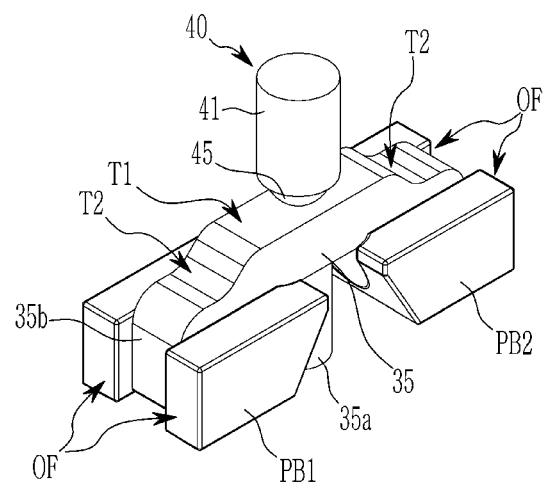
FIG. 5 and FIG. 6 are respectively a perspective view and a cross-sectional perspective view of an assembly of a push block and a push spring applied to a key of a synchronizer apparatus for a transmission according to an exemplary form of the present disclosure.
Figure 6:
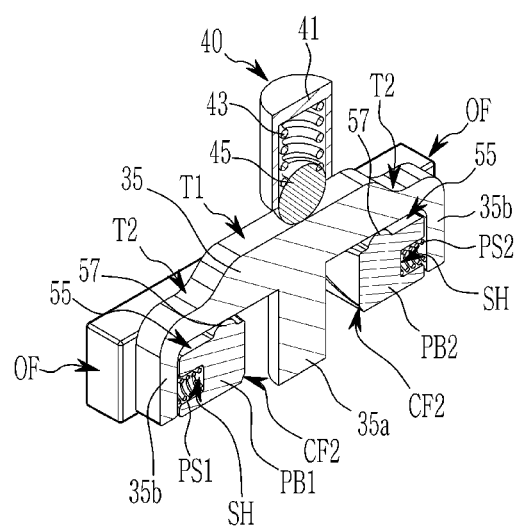

FIG. 5 and FIG. 6 are respectively a perspective view and a cross-sectional perspective view of an assembly of a push block and a push spring applied to a key of a synchronizer apparatus for a transmission according to an exemplary form of the present disclosure.

According to an exemplary form, three keys 35 are employed to be installed in key catching recesses 31a that are formed toward a radial exterior, respectively by the three slope portions 37.

It may be understood that the number of keys 35 is not limited to three, and may vary with the number of key catching recesses 31a and the slope portions 37.

The key 35 includes a pressurizing surface T1 and pressure release surfaces T2 extending from the pressurizing surface T1. The pressurizing surface T1 is formed, as a central flat surface, on an exterior surface to contact a poppet ball 45 of the poppet ball unit 40. The pressure release surface T2 is formed as a curved surface extending from both sides of and downward from the pressurizing surface T1.

A cylindrical insertion end 35a is integrally formed at a bottom center of the key 35 such that the key 35 may be coupled with the hub 31 by the insertion end 35a being inserted in the key catching recess 31a.

Bent ends 35b are formed at ends of the pressure release surfaces T2 of the key 35, thereby forming receiving spaces to receive the first and second push blocks PB1 and PB2, first and second push springs PS1 and PS2, at both sides of the key 35.

Referring to FIG. 2 and FIG. 3, the first and second clutch gears CG1 and CG2 are disposed between the hub 31 and the first and second shifting gears G1 and G2, respectively. The first and second clutch gears CG1 and CG2 integrally rotate with the first and second shifting gears G1 and G2, to mediate power delivery to the first and second shifting gears G1 and G2.

The first and second clutch gears CG1 and CG2 are selectively engaged with the sleeve 33 through spline coupling, by a movement of the sleeve 33.

The first and second outer rings OR1 and OR2 are disposed between the hub 31 and the first and second clutch gears CG1 and CG2, respectively. The first and second outer rings OR1 and OR2 are selectively engaged with the sleeve 33 through spline coupling, by a movement of the sleeve 33.

The first and second inner rings IR1 and IR2 are disposed between the hub 31 and the first and second clutch gears CG1 and CG2, respectively, being radially interior to the first and second outer rings OR1 and OR2. The first and second inner rings IR1 and IR2 may be engaged with the first and second clutch gears CG1 and CG2 respectively, by conical clutch operation.

The first and second synchronizer cones SC1 and SC2 are disposed between the first inner and outer rings IR1 and OR1 and the second inner and outer rings IR2 and OR2, respectively. The first and second synchronizer cones SC1 and SC2 are engaged with the first and second clutch gears CG1 and CG2.

The first and second synchronizer cones SC1 and SC2 may limit relative rotation of the first and second outer rings OR1 and OR2 and the first and second inner rings IR1 and IR2 with respect to the hub 31.

The first and second outer rings OR1 and OR2 and first and second inner rings IR1 and IR2 may function as conventional synchronizer rings. When the sleeve 33 moves in an axial direction during the shifting process, the first and second outer rings OR1 and OR2 receive an axial directional force from the key 35, and thereby engaged with the corresponding clutch gears CG1 and CG2 through the first and second inner rings IR1 and IR2 by the conical clutch operation.

Referring to FIG. 6, the poppet ball unit 40 is disposed at in interior circumference of the sleeve 33 at locations corresponding to the three keys 35. The poppet ball unit 40 contacts an exterior surface of the key 35 through the poppet ball 45.

According to the poppet ball unit 40, a spring housing 41 is disposed in an installation hole H formed in an interior circumference of the sleeve 33, and a ball spring 43 is inserted in the spring housing 41.

While the poppet ball 45 inserted in the spring housing 41 is elastically supported by the ball spring 43 to contact and pressurize the exterior surface of the key 35 in a radial direction.

Figure 7:
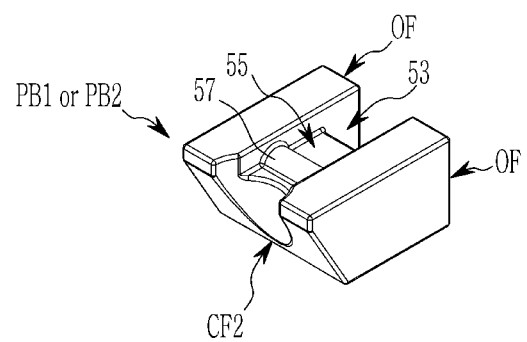
FIG. 7 is a perspective view of a push block applied to a synchronizer apparatus for a transmission according to an exemplary form of the present disclosure.

FIG. 7 is a perspective view of a push block applied to a synchronizer apparatus for a transmission according to an exemplary form of the present disclosure.

Referring to FIG. 3, the first and second push blocks PB1 and PB2 are disposed at both slanted surfaces CF1 of the slope portion 37 of the hub 31.

Referring to FIG. 6 and FIG. 7, each of the first and second push blocks PB1 and PB2 includes an outer surface OF facing an interior surface of corresponding outer rings OR1 and OR2, a coupling recess 53 to be coupled with the key 35, and a cam surface CF2 formed at an interior surface of the bush blocks PB1 and PB2 and formed as a slant surface to form a surface contact with a corresponding slanted surface CF1 of the slope portion 37 the hub 31.

The first and second push blocks PB1 and PB2 further include a protrusion end 57 formed upward from a central upper surface 57 forming the coupling recess 53. The first and second push blocks PB1 and PB2 may form a line contact with a bottom surface of the key 35 through the protrusion end 57.

The protrusion end 57 may have a semicircular cross-section, i.e., a half-cylindrical shape.

Referring to FIG. 6, the first and second push springs PS1 and PS2 are inserted in spring holes SH formed at outer surfaces OF of the first and second push blocks PB1 and PB2, respectively. The first and second push springs PS1 and PS2 are abutted by interior surfaces of both bent ends 35b of the key 35 such that the cam surfaces CF2 of the push blocks PB1 and PB2 may tightly contact the slanted surfaces CF1 of the slope portion 37 of the hub 31.

The first and second push springs PS1 and PS2 may be formed as coil springs, and each of the spring hole SH is formed at a central portion between the outer surfaces OF forming the coupling recess 53.

In such a synchronizer apparatus for a transmission, the key 35 is engaged with the key catching recess 31a formed at the slope portion of the hub 31 by the insertion end 35a, and may rotated with the hub 31 while allowing a motion in the radial direction.

A radial directional position of the key 35 is determined by a location of the poppet ball 45 contacting the exterior surface of the key 35. The force of the key 35 pressing the poppet ball 45 acts as a force on the synchronizer ring of the outer and inner rings OR1 and IR1 (or OR2 and IR2).

Figure 8:
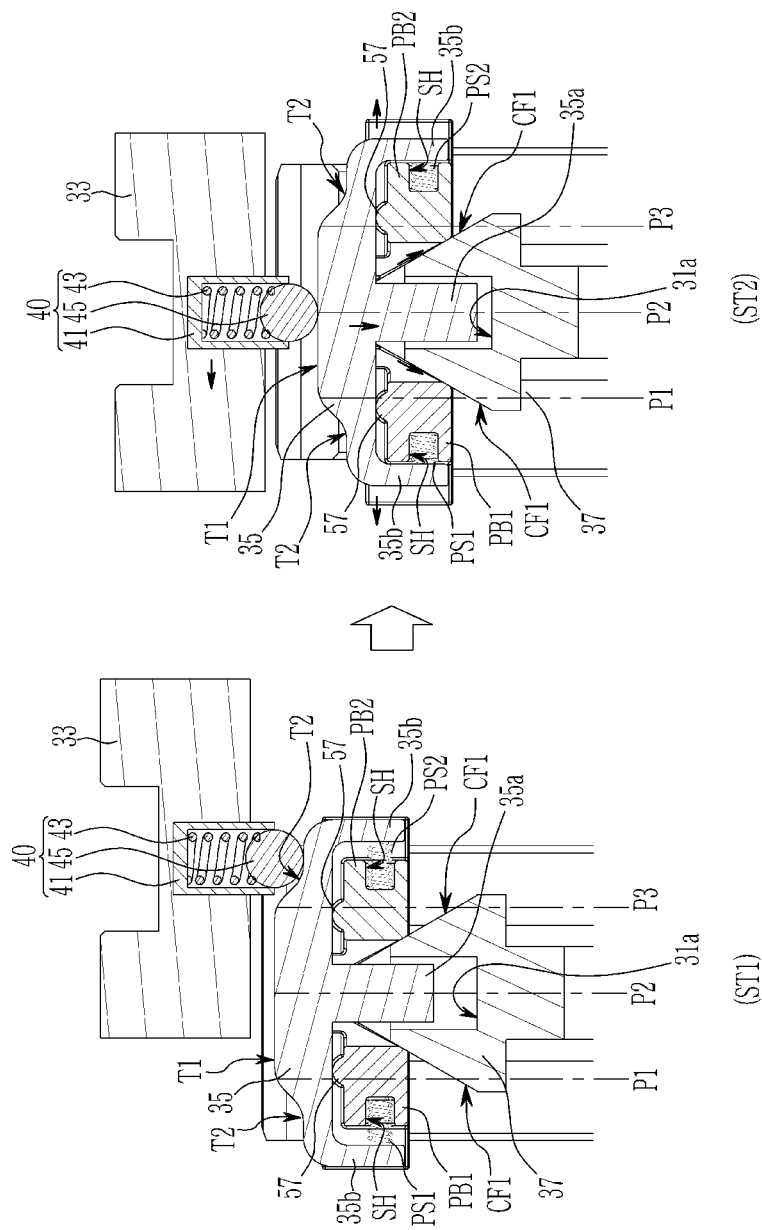
FIG. 8 illustrates an operation of a push block applied to a synchronizer apparatus for a transmission according to an exemplary form of the present disclosure.
Figure 9:
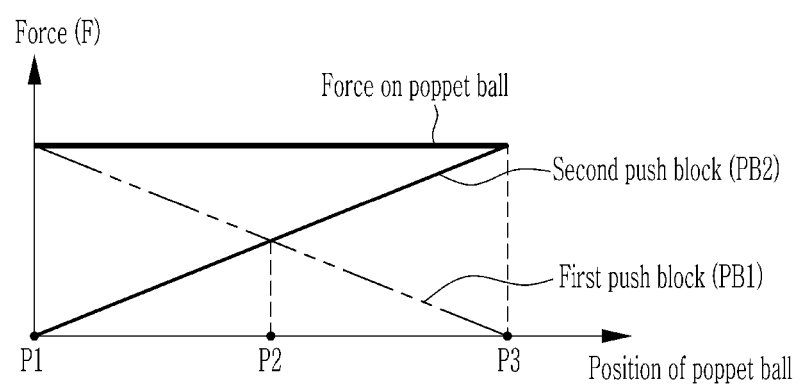
FIG. 9 illustrates forces applied to first and second push blocks of a synchronizer apparatus for a transmission according to an exemplary form of the present disclosure depending on position of a poppet ball.

FIG. 8 illustrates an operation of a push block applied to a synchronizer apparatus for a transmission according to an exemplary form of the present disclosure. FIG. 9 illustrates forces applied to first and second push blocks of a synchronizer apparatus depending on position of a poppet ball.

Referring to FIG. 8, the first and second push blocks PB1 and PB2 are coupled with the key through the coupling recess 53, thereby limiting the rotational movement of the key 35.

In addition, the cam surfaces CF2 of the first and second push blocks PB1 and PB2 tightly contacts the slanted surface CF1 of the slope portion 37 of the hub 31.

The first and second push springs PS1 and PS2 is inserted in the spring holes SH formed at the first and second push blocks PB1 and PB2, and abutted by the both bent ends 35b of the key 35, thereby forming an elastic force pushing the push blocks PB1 and PB2 toward the hub 31.

By being in a tight contact with the slanted surfaces CF1 of the hub 31 through the cam surfaces CF2, the first and second push blocks PB1 and PB2 are applied with a biasing force in a radial direction by the elastic force of the first and second push springs PS1 and PS2. Such a radially biasing force on the push blocks PB1 and PB2 may prevent a gap between the key 35 and the poppet ball 45 while the sleeve 33 moves.

When the first and second push blocks PB1 and PB2 move radially outward, a distance between the first and second push blocks PB1 and PB2 are increased, i.e., the first and second push blocks PB1 and PB2 become farther. When the first and second push blocks PB1 and PB2 move radially inward, a distance between the first and second push blocks PB1 and PB2 are decreased, i.e., the first and second push blocks PB1 and PB2 become closer.

As shown FIG. 8, in a state ST1, when the poppet ball 45 is located on the pressure release surface T2 of the key 35 according to a movement of the sleeve 33, the first and second push blocks PB1 and PB2 move radially outward along the slanted surface CF1 of the hub 31. Then, the first and second push blocks PB1 and PB2 become closer in the axial direction, and therefore become apart from the first and second outer rings OR1 and OR2, such that the force of the poppet ball 45 is not transmitted to the outer rings OR1 and OR2.

As shown FIG. 8, in a state ST2, when the poppet ball 45 is located on the pressurizing surface T1 of the key 35 according to a movement of the sleeve 33, the first and second push blocks PB1 and PB2 move radially inward along the slanted surface CF1 of the hub 31, together with the key 35, by the force of the poppet ball 45 pressing the key 35. Then, the first and second push blocks PB1 and PB2 become farther from each other in the axial direction, and therefore contacts the first and second outer rings OR1 and OR2, such that the force of the poppet ball 45 is transmitted to the outer rings OR1 and OR2.

Referring to FIG. 9, between the contact points P1 and P3 of the protrusion ends 57 with the key 35, the force on the first and second push blocks PB1 and PB2 are inversely proportional to a distance from a contact point between the poppet ball 45 and the key 35 to a contact point between the key 35 and the protrusion ends 57 of the push blocks PB1 and PB2, respectively. A sum of the forces on the first and second push blocks PB1 and PB2 equals to the force of the poppet ball 45 on the key 35.

FIG. 10A to FIG. 10E illustrate a shifting process of a synchronizer apparatus for a transmission according to an exemplary form of the present disclosure.

Referring to FIG. 10A to FIG. 10E, shifting operations of the synchronizer apparatus is described in detail.

Figure 10A:
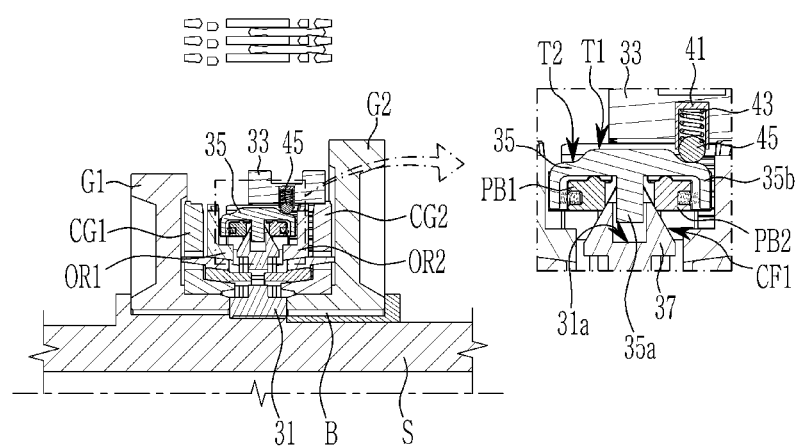
FIG. 10A to FIG. 10E illustrate a shifting process of a synchronizer apparatus for a transmission according to an exemplary form of the present disclosure.

In FIG. 10A, the sleeve 33 is disposed to the right in the drawing, and the hub 35 is spline coupled with the second outer ring OR2 and the second clutch gear CG2 through the sleeve 33. Therefore, the sleeve 33 synchronously interconnects the second shifting gear G2 with the output shaft S.

In this state, the poppet ball 45 is located on the right pressure release surface T2 of the key 35, and the first and second push blocks PB1 and PB2 are positioned radially outward by moving along the slanted surface CF1 of the hub 31 together with the key 35. The first and second push blocks PB1 and PB2 become closer in the axial direction, and therefore become apart from the first and second outer rings OR1 and OR2, such that the force of the poppet ball 45 is not transmitted to the outer rings OR1 and OR2.

Figure 10B:
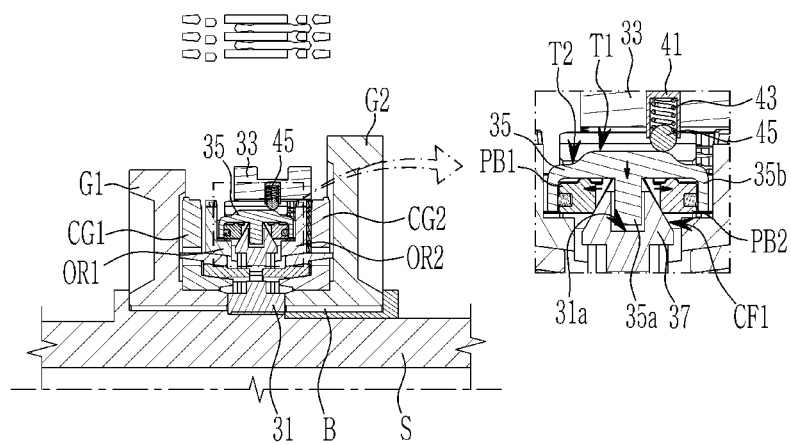

As shown in FIG. 10B, when the sleeve 33 moves to the left in the drawing in the axial direction such that the poppet ball 45 is located at a rightmost end of the pressurizing surface T1 of the key 35, the sleeve 33 is now spline coupled with the hub 35 and the second outer ring OR2, releasing the coupling with the second clutch gear CG2. Therefore, the synchronous coupling between the second shifting gear G2 and the output shaft S is released.

Then, the poppet ball 45 presses the key 35, and accordingly, the first and second push blocks PB1 and PB2 moves radially inward along the slanted surface CF1 of the hub 31 together with the key 35. The first and second push blocks PB1 and PB2 become farther from each other in the axial direction, and therefore contacts the first and second outer rings OR1 and OR2, such that the force of the poppet ball 45 is transmitted to the outer rings OR1 and OR2.

In this state, the force of the poppet ball 45 is mostly transmitted to the second push block PB2, and accordingly the synchronizer ring of the second outer and inner rings OR2 and IR2 maintains the function. Therefore, the torque of the output shaft S is still transmitted to the second shifting gear G2 which is to be released.

Figure 10C:
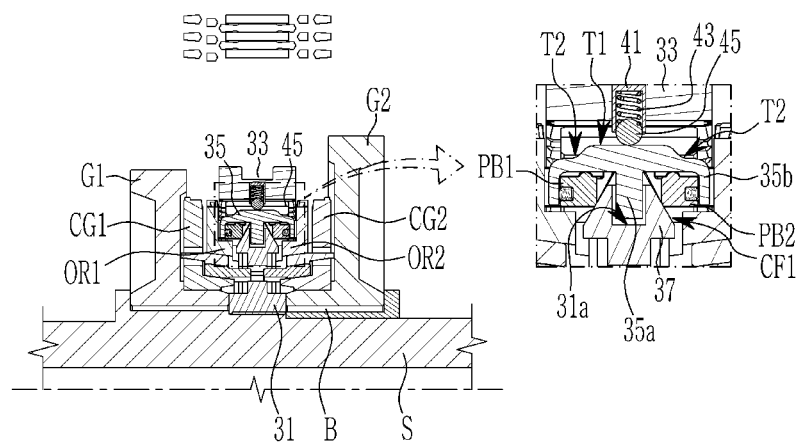

Then, as shown in FIG. 10C, the sleeve 33 moves to a neutral position and the poppet ball 45 is located at a center of the pressurizing surface T1 of the key 35. In this case, the sleeve 33 is spline coupled with the hub 35 only.

Then, the force of the poppet ball 45 on the key 35 equally acts on the first and second outer rings OR1 and OR2 through the outer surfaces OF of the first and second push blocks PB1 and PB2.

In this state, the force of the poppet ball 45 is equally transmitted to the first and second outer rings OR1 and OR2 and the first and second inner rings IR1 and IR2 through the first and second push blocks PB1 and PB2. Therefore, a torque phase process is realized, which is an interim phase where the torque transmission from the hub 31 is being changed from the second outer ring OR2 to the first outer ring OR1.

Figure 10D:
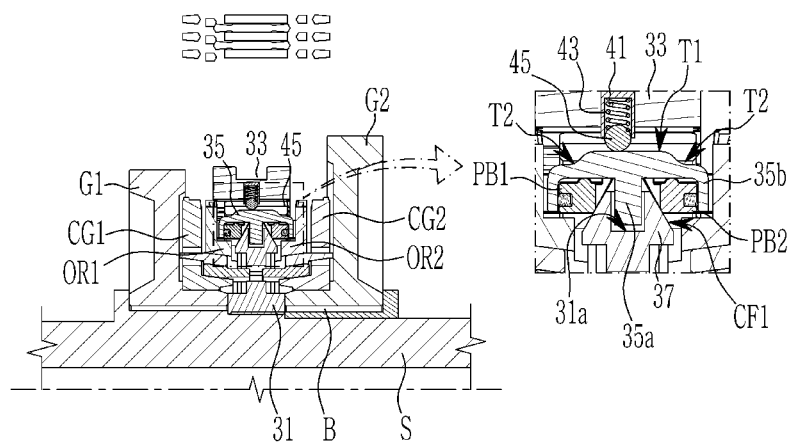

Subsequently in FIG. 10D, the sleeve 33 moves to the left in the drawing in the axial direction and the poppet ball 45 is located to the left portion of the pressurizing surface T1 of the key 35. In this case, the sleeve 33 is spline coupled with the hub 35 and the first outer ring OR1, and the first shifting gear G1 and the output shaft S are synchronously interconnected.

Then, by the force of the poppet ball 45 on the key 35, outer surfaces OF of the first and second push blocks PB1 and PB2 respectively contact the first and second outer rings OR1 and OR2.

In this state, the force of the poppet ball 45 is mostly transmitted to the first push block PB1, and accordingly the synchronizer ring of the first outer and inner rings OR1 and IR1 maintains the function. Therefore, the torque of the output shaft S is still transmitted to the first shifting gear G1 which is to be engaged.

Figure 10E:
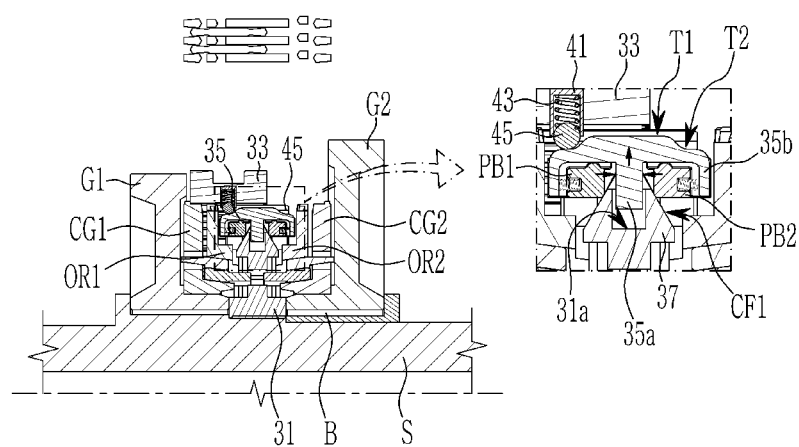

Subsequently in FIG. 10E, the sleeve 33 is disposed to the left in the drawing, and the hub 35 is spline coupled with the first outer ring OR1 and the first clutch gear CG1 through the sleeve 33. Therefore, the sleeve 33 synchronously interconnects the first shifting gear G1 with the output shaft S.

In this state, the poppet ball 45 is located on the left pressure release surface T2 of the key 35, and the first and second push blocks PB1 and PB2 are positioned radially outward by moving along the slanted surface CF1 of the hub 31 together with the key 35.

In addition, the first and second push blocks PB1 and PB2 become closer in the axial direction, and therefore become apart from the first and second outer rings OR1 and OR2, such that the force of the poppet ball 45 is not transmitted to the outer rings OR1 and OR2.

According to a synchronizer apparatus for a transmission according to an exemplary form of the present disclosure, push blocks PB1 and PB2 and push springs PS1 and PS2 are employed to both sides of the key 35 and the hub 31. During a shifting operation from a to-be-released shifting gear to a to-be-engaged shifting gear, torque transmission to the to-be-released shifting gear is maintained until the to-be-engaged shifting gear is actually initiated to be engaged. Therefore, interruption of torque transmission during the shifting operation is significantly reduced or minimized.

In addition, forces on synchronizer rings at opposite sides of the hub are inversely proportional to each other according to movement of the sleeve, and accordingly, a shift shock and/or an impact noise possibly caused by a stopper and a sleeve may be reduced.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

S: output shaft
G1,G2: first and second shifting gears
CG1,CG2: first and second clutch gears
OR1,OR2: first and second outer rings
IR1,IR2: first and second inner rings
SC1,SC2: first and second synchronizer cones
31: hub
31a: key catching recess
33: sleeve
35: key
35a: insertion end
35b: bent end
37: slope portion
CF1: slanted surface
CF2: cam surface
40: poppet ball unit
41: spring housing
43: ball spring
45: poppet ball
51: gear sleeve
57: protrusion end
PB1, PB2: push block
PS1, PS2: push spring
T1: pressurizing surface
T2: pressure release surface
B: bearing

What is claimed is:

1. A synchronizer apparatus for a transmission, comprising:
   first and second shifting gears rotatably disposed on an output shaft;
   a hub spline coupled with the output shaft, the hub having a plurality of slope portions having slanted surfaces at axially forward and rearward sides of the hub, the plurality of slope portions being symmetrically disposed along a circumferential direction of the hub;
   a sleeve spline coupled with an external circumference of the hub;
   a plurality of keys installed in key catching recesses that are formed radially outward respectively by the plurality of slope portions;
   first and second clutch gears disposed between the hub and the first and second shifting gears, respectively;
   first and second outer rings and first and second inner rings disposed between the hub and the first and second clutch gears, respectively;
   first and second synchronizer cones disposed between the first inner and outer rings and the second inner and outer rings and engaged with the first and second clutch gears, respectively;
   a plurality of poppet ball units disposed at an interior circumference of the sleeve at locations corresponding to the plurality of keys, the poppet ball units configured to contact an exterior surface of the plurality of keys through a poppet ball;
   a plurality of first and second push blocks disposed at both slanted surfaces of the plurality of slope portions, respectively; and
   a plurality of first and second push springs inserted in spring holes formed at outer surfaces of the plurality of first and second push blocks, respectively, the first and second push springs being abutted by interior surfaces of the plurality of keys such that cam surfaces of the push blocks tightly contact the slanted surfaces of the plurality of slope portions of the hub, respectively,
   wherein each of the plurality of keys comprises an insertion end integrally formed at a bottom center of the key such that the key is coupled with the hub by the insertion end as being inserted in the key catching recess.

2. The synchronizer apparatus of claim 1, wherein each of the plurality of keys comprises:

a pressurizing surface formed as a central flat surface on an exterior surface to contact the poppet ball of the poppet ball unit; and a pressure release surface formed as a curved surface extending from both sides of and downward from the pressurizing surface.

3. The synchronizer apparatus of claim 2, wherein each of the plurality of keys comprises bent ends formed at ends of the pressure release surfaces, thereby forming the interior surfaces to abut the first and second push springs.

4. The synchronizer apparatus of claim 1, wherein each poppet ball unit of the poppet ball unit comprises:

a spring housing inserted in an installation hole formed in interior circumference of the sleeve;

a ball spring inserted in the spring housing; and a poppet ball inserted in the spring housing and elastically supported by the ball spring such that the poppet ball is configured to contact and pressurize the exterior surface of a key of the plurality of keys in a radial direction.

5. The synchronizer apparatus of claim 1, wherein each of the first and second push blocks comprises:

an outer surface facing an interior surface of a corresponding outer ring among the first and second outer rings;

a coupling recess to be coupled with a key among the plurality of keys; and a cam surface formed as a slant surface to form a surface contact with a slanted surface among the slanted surfaces of the slope portions.

6. The synchronizer apparatus of claim 5, wherein each of the first and second push blocks further comprises: a protrusion end formed upward from a central upper surface forming the coupling recess, thereby forming a line contact with a bottom surface of the plurality of keys.

7. The synchronizer apparatus of claim 6, wherein a cross-section of the protrusion end is a semicircular.

8. The synchronizer apparatus of claim 5, wherein:

the first and second push springs are inserted in spring holes formed at outer surfaces of the first and second push blocks, respectively; and the first and second push springs are formed as coil springs abutted by the interior surfaces of the plurality of keys.

* * * * *